United States Patent [19] | [11] 4,410,581
Nam | [45] Oct. 18, 1983

[54] LASER RECORDING MEDIUM

[75] Inventor: Billie Nam, Cupertino, Calif.

[73] Assignee: Omex, Santa Clara, Calif.

[21] Appl. No.: 289,975

[22] Filed: Aug. 4, 1981

Related U.S. Application Data

[63] Continuation of Ser. No. 80,517, Oct. 1, 1979, abandoned.

[51] Int. Cl.[3] .................... G01G 15/34
[52] U.S. Cl. .................... 428/195; 346/76 L; 346/135.1; 369/284; 427/255.6; 428/209; 428/210; 428/913; 430/945; 430/961
[58] Field of Search .................... 219/121 L, 121 LH; 346/76 L, 135.1; 427/53.1, 76, 255.6; 428/209, 210, 431, 457, 913, 195, 212, 500; 430/363, 945, 523, 531, 961; 369/283, 284

[56] References Cited

U.S. PATENT DOCUMENTS

| | | | |
|---|---|---|---|
| 3,911,444 | 10/1975 | Lou et al. | 346/76 L |
| 3,971,874 | 7/1976 | Ohta et al. | 428/432 |
| 3,990,084 | 11/1976 | Mamisch et al. | 430/945 |
| 4,032,691 | 6/1977 | Kido et al. | 428/304 |
| 4,069,487 | 1/1978 | Kasai et al. | 346/135.1 |
| 4,101,907 | 7/1978 | Bell et al. | 346/135.1 |

FOREIGN PATENT DOCUMENTS

| | | | |
|---|---|---|---|
| 1402760 | 8/1975 | United Kingdom | 346/135.1 |
| 1445546 | 8/1976 | United Kingdom | 346/135.1 |
| 2026901 | 2/1980 | United Kingdom | 346/135.1 |
| 2029268 | 3/1980 | United Kingdom | 346/135.1 |
| 2042749 | 9/1980 | United Kingdom | 346/135.1 |

OTHER PUBLICATIONS

R.C.A. Review, vol. 40, Sep., 1979, A. E. Bell.

*Primary Examiner*—Bruce H. Hess
*Attorney, Agent, or Firm*—Flehr, Hohbach, Test, Albritton & Herbert

[57] ABSTRACT

A laser recording medium in which the metal recording layer is completely encapsulated between an intermediate layer of solvent resistant plastic material formed on a substrate and a protective layer of solvent-based plastic material formed on the recording layer. In some examples the solvent resistant plastic material is a cross-linked polymeric material formed in a solvent coating process and in other examples the solvent resistant plastic material is a vapor deposited polymeric material.

7 Claims, 2 Drawing Figures

40

LASER RECORDING MEDIUM

The U.S. Government has rights in this invention pursuant to grant C-DAR 78-21344 from the National Science Foundation.

This is a continuation of application Ser. No. 080,517 filed Oct. 1, 1979, now abandoned.

This invention relates generally to binary data information storage systems and, in particular, to a data recording medium responsive to energy from a focused laser beam.

The data processing industry has made rapid strides in providing computers systems and related peripheral equipment for manipulating binary encoded numeric and alphabetic data at faster speeds and storing such data at higher densities and lower costs. Large corporations and government bureaus have placed increasing reliance on data processing equipment in automating data collection, storage and processing to improve the efficiency of handling business transactions, accounting information, etc. Increases in computer operating speeds are largely the result of improvements in semiconductor technology which have produced large scale integrated (LSI) circuits involving higher densities of binary logic elements or gates operating at faster speeds. Substantial increases in memory densities have also been achieved. In the semiconductor memory area, bit density increases have resulted both from improved LSI technology which enables a shrinking of the size of memory cell elements and from new LSI technology such as magnetic bubble domain memories. In the magnetic memory area, density improvements in hard and flexible disc systems have been achieved by improvements in magnetic recording media and reading and writing heads associated therewith.

Despite the substantial increases in semiconductor and magnetic memory system densities, the cost per bit of such storage media together with encoding costs does not justify the use of such technology for storing, on a routine basis, large volumes of traditional business records, such as correspondence, reports, forms, legal documents, etc. The storage and maintenance of both current working files of these documents and archives of selected documents which must be retained securely for long periods of time is still largely a manual operation involving increasingly costly personnel and storage space.

Digital laser recording technology has been developed in recent years to provide high density binary data storage which is readily integratable with both computer data processing equipment and facsimile document scanning and printing apparatus. This technology enables real time optical recording of image data in a highly compressed format and rapid opto-electronic access to recorded image data and can thus provide the basic framework for computer based document storage and retrieval and an overall record management system. At the heart of this technology is a laser beam writing and reading system which is capable of storing binary digital information in the form of the presence or absence of minute holes created in a thin film recording medium as a highly focused, modulated laser beam is scanned across the recording medium.

The basic principles of laser image recording are set forth in Becker U.S. Pat. No. 3,474,457. Becker et al. U.S. Pat. No. 3,654,624 and McFarland et al. U.S. Pat. No. 3,657,707 show a laser recording system utilizing a rotating drum carrying a laser recording medium comprising flexible strips of plastic materials (such as Mylar) with a layer of energy absorbing material thereon. Such a laser recording medium is more fully described in Becker et al. U.S. Pat. No. 3,665,483. However, the use of a rotating drum or other mechanical scanning of the recording medium limits the record scanning speed during both recording and retrieval of data and thus artificially constrains the overall system to data writing and reading speeds substantially less than those dictated by available laser beam energies and recording media sensitivities. In addition, the use of flexible recording media limits the alignment precision which can be reproducibly achieved between data tracks and the laser beam path and, correspondingly, constrains the system to data bit densities substantially lower than the minimum cell size dictated by the system optics. Moreover, flexible recording media are highly subject to contamination by dust particles which may cause data writing and/or reading errors and thus require special handling and storage in dust-free compartments within the system. It is thus apparent that different approaches to scanning the laser beam across the recording medium and different structures for the recording medium itself are required to provide a system that fully utilizes the write/read speed and bit densities of which laser beam recording technology is inherently capable and also simplifies the recording media storage and handling requirements.

Becker et al. U.S. Pat. No. 4,001,840 discloses a laser recording system which utilizes a mirror assembly rotatable on two orthogonal axes to deflect a laser beam in two directions for writing data on a recording layer formed on a rigid glass substrate. This mirror-beam deflection system is capable of achieving faster beam scanning, and the rigid glass substrate supporting the recording layer enables more precise, reproducible alignment between the recording medium and the scanned laser beam. However, it has been found that the use of a layer of recording material directly on a glass substrate results in a laser recording medium of substantially less sensitivity than a corresponding laser recording medium comprising a recording layer formed on a plastic substrate. In addition, the affinity between the metal recording layer and a glass substrate may produce irregularities in the shapes and sizes of holes burned into the recording layer. Use of a glass substrate thus necessitates the forming of a more complex recording medium in order to maintain overall sensitivity of the laser recording system and to achieve high writing speeds with low error rates.

A copending and commonly assigned application of Kaczorowski and Shen, Ser. No. 950,066, filed Oct. 10, 1978 (now abandoned in favor of continuation application Ser. No. 122,613, filed Feb. 19, 1980 now abandoned), discloses the use of a layer of common, solvent-based plastic material between a glass substrate and the layer of recording material to produce a recording medium of substantially improved sensitivity and hole forming characteristics. This copending application further discloses the use of an additional protective layer of material over the thin recording layer. Artisans in this field have generally recognized the benefits of combining a layer of plastic material intermediate the substrate and the recording layer with a protective coating over the recording layer. However, while plastics have been suggested for use as the protective layer, in practice artisans have typically employed inorganic materials such as silicon dioxide in the protective coating, because the solvent-based plastic materials of the intermediate layer are dissolved or attacked when a protective layer of the same or similar solvent-based plastic material is attempted to be applied as the solvent utilized readily penetrates the thin layer of laser recording material.

In a copending and commonly assigned application of A. Forster and M. Ockers, Ser. No. 080,516, filed Oct. 1, 1979, now U.S. Pat. No. 4,360,820 the use of a vapor deposited plastic layer as a protective coating for a laser recording medium is disclosed. In this application the method of depositing the protective plastic layer on top of the recording layer of the medium precludes any attacking of the intermediate layer between the substrate and the recording layer, since no solvent is present in the vapor deposition process. Accordingly, the intermediate layer between the recording layer and the substrate may be a layer of solvent-based plastic material. Alternatively, Forster and Ockers disclose the use of a vapor deposited layer of plastic material as the intermediate layer between the substrate and the recording layer. While the Forster and Ockers approach provides a recording medium in which the recording layer is encased between two plastic layers, it requires the use of special vapor deposition apparatus to form the parylene layers utilized in the recording medium.

A laser recording medium in accordance with this invention comprises a substrate, a first layer of plastic material formed on the substrate, a layer of optical energy absorbing material (i.e. a recording layer) formed on the first layer of plastic material, and a second layer of plastic material formed on the recording layer to provide a protective coating therefore, with the plastic material of the first layer being characterized by substantial solvent resistance and the plastic material of the second layer being a solvent-based plastic material. In accordance with a further aspect of this invention, the plastic material of the first layer formed on the substrate is a crosslinked polymeric material formed by reacting one or more components of a class of materials comprising active polymers with one or more components of a class of materials comprising cross-linking organic moieties. Preferably the reaction forming the crosslinked polymeric material is carried out at elevated temperature and in the presence of a selected catalyst to speed the formation of the crosslinked material. Alternatively, certain components of crosslinking organic moieties may be reacted together in the presence of a selected catalyst to form self-condensation, crosslinked polymers. By appropriate selection, solvent-resistant plastic layers which have all the necessary characteristics for serving as an intermediate layer are formed.

In accordance with another aspect of this invention, the plastic material of the first layer is a polymeric material formed in a vapor deposition process wherein a hot reactive monomer vapor is condensed as a polymeric coating on the substrate. The polymeric material formed in this fashion may comprise a parylene material.

By first forming a layer of solvent-resistant plastic material on the substrate, a multi-layer laser recording medium can be readily completed by next forming the thin recording layer on the solvent-resistant intermediate layer and then promptly coating the recording layer with a layer of common, solvent-based plastic material to seal the recording layer against any deterioration which may otherwise be caused by abrasion or reaction with the ambient environment to form metal oxides or contamination from the ambient atmosphere. Thus, in accordance with this invention solvent-resistant coating is formed on the substrate at a less critical time in the process of forming a laser recording medium, so that final protection of the recording layer formed thereon can be simply and promptly provided by a solvent-based plastic layer.

Other features and advantages of this invention will be apparent from the consideration of the detailed description given below in conjunction with the accompanying drawings.

Figure 1:
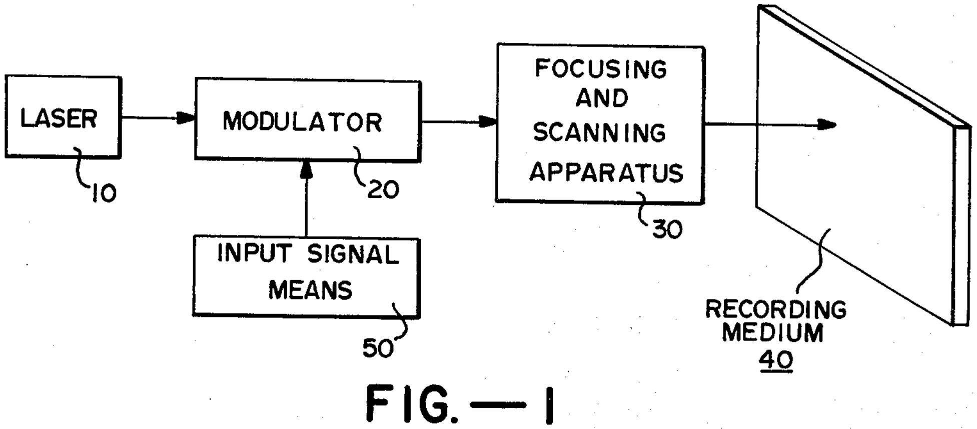
FIG. 1 is a block diagram illustrating exemplary laser recording apparatus utilizing a laser recording medium in accordance with this invention.

FIG. 1 illustrates the apparatus utilized in a typical laser beam recording system. This type of laser recording system is now generally well known in the art and need not be discussed in detail herein. Reference is made to the above mentioned Becker U.S. Pat. No. 3,474,457 and Becker et al. U.S. Pat. No. 4,001,840 for a more detailed discussion of the principles of laser recording and exemplary apparatus embodying these principles. Generally laser beam recording involves the use of a laser 10 with its output coupled to a beam modulator 20 which is driven by an input signal means 50 to produce a modulated laser beam output. In a binary data writing mode the input signals means supplies a stream of binary digits such that the modulator produces a binary amplitude modulation of the laser beam. Focusing and scanning apparatus 30 receives the modulated laser beam, focuses it to a very small spot on recording medium 40 and scans it in a predetermined pattern across recording medium 40. As the modulated laser beam strikes various sequential cell locations of the recording layer in laser recording medium 40, it burns a very small hole (0.5–1.0 microns in diameter) therein if the modulated laser beam is on at that time or leaves the recording layer undisturbed if the modulated laser beam is off. The term "burn" is typically used in the art to describe the hole formation in the recording layer even though the recording layer is actually melted or vaporized to create a hole rather than being burned in the ordinary sense of the word. Accordingly, the binary data input to the modulator 20 is reproduced on recording medium 40 as the presence or absence of a hole at each cell location in the recording medium. The bit pattern written into recording medium 40 can be later read by again scanning the recording medium with an unmodulated laser beam and detecting the presence or absence of a hole in each cell location in terms of the amount of light reflected at each cell location.

As generally discussed above, laser data recording apparatus is inherently capable of recording binary data at very high densities on the order of about $10^9$ bits per square inch. As previously noted to provide apparatus which enables a laser recording system to achieve bit densities approaching the inherent capability of the technology it places heavy demands on all aspects of the laser recording system and especially the laser recording medium. Since data is recorded in the form of the presence or absence of minute holes burned into the recording layer by highly focused laser beam, the overall stability and durability of the laser recording medium both during the recording process and for a long time period thereafter is critical in determining the ultimate bit density which can be utilized and still achieve data writing and reading at low error rates over long periods of time. Stability and durability are especially critical if the laser recording system is to be utilized for archival storage of image data from documents which are thereafter destroyed.

To provide a recording medium which can accurately and reproducably be aligned with the scanning laser beam in a laser recording system requires that the recording medium utilize a dimensionally stable inflexible substrate such as a thin glass slide of the type generally used by the semiconductor industry in forming highly accurate photomasks used in the production of large scale integrated circuits. Such glass slides form the basis for a recording medium which has excellent dimensional stability and can easily be integrated into an overall data slide handling system for reproducibly positioning the recording medium with reference to the scanning path of the laser beam. Further, it is necessary to form on the glass substrate a recording layer of material which is sensitive to optical energy of the wavelength of the laser beam in a manner which will provide overall long term stability for the recording medium.

Figure 2:
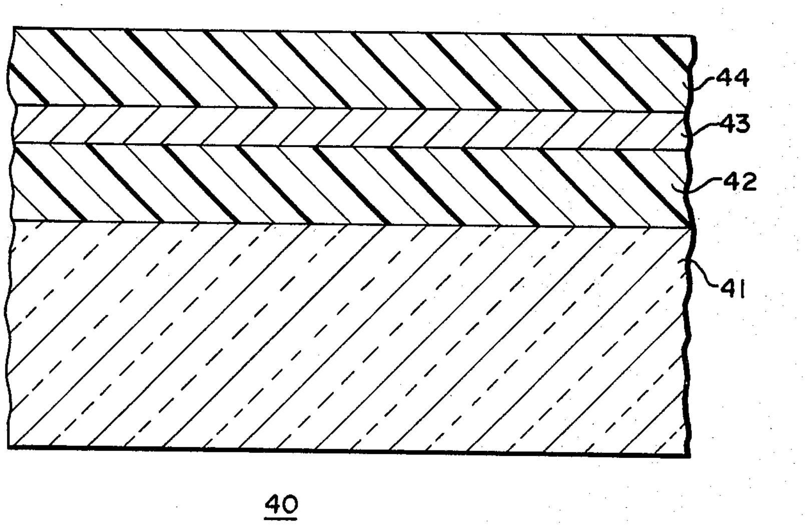
FIG. 2 is a fragmented cross-sectional view of the structure of a laser recording medium in accordance with this invention.

FIG. 2 illustrates the structure of a laser recording medium in accordance with this invention as comprising a transparent substrate 41 having formed thereon a first layer of plastic material 42, a recording layer 43 and a second layer of plastic material 44. Transparent substrate 41 is preferably a glass slide. Conveniently, the glass slide may be about four inches square and 60 mils thick. On one surface of glass substrate 41 a first layer of plastic material 42 is formed. Preferably the laser beam is incident on recording layer 43 through the glass substrate 41 and intermediate layer 42 since any dust particles which might accumulate on the exposed substrate surface are then out-of-focus during reading and writing of data in recording layer 43. In accordance with this invention the material of this first layer is characterized by substantial solvent-resistance. This characteristic may be achieved by utilizing a crosslinked polymeric material which, although utilizing solvent-based plastic materials in its formation, achieves substantial solvent-resistance due to the cross-linking of the polymers comprising the final material of the layer.

Alternatively, solvent-resistant plastic layer 42 can be provided by utilizing a polymeric material such as parylene which also has a high solvent resistance and is formed in a vapor deposition process wherein a hot reactive monomer vapor is condensed on substrate 41 as a polymeric coating. This condensed polymeric coating is optionally formed only on one surface of the glass substrate 41 if suitable masking techniques are utilized on the other surface or may be formed on all surfaces of substrate 41. Depending on the process utilized in forming solvent-resistant plastic layer 42 it may be formed to a thickness in the range of 0.05 microns to 10 microns. Thickness values throughout this range are readily attainable utilizing a parylene vapor deposition process. When utilizing a coating process involving plastic material initially dissolved in a solvent, thicknesses in the range from 0.5 to about 2 microns are readily achievable.

The optical and other characteristics of the materials of an intermediate layer 42 of solvent-resistant plastic materials are suited to a laser recording medium for use in a system in which the recording layer is burned by a laser beam transmitted through both the substrate and the intermediate layer. Intermediate layers which have high optical clarity are produced. The solvent resistant materials have an index of refraction in the range of 1.3–1.7 and are thus sufficiently closely matched to that of glass to minimize reflections. These materials also have a much lower thermal conductivity than the glass substrate to provide a laser recording medium of high sensitivity to laser beam energy. The materials adhere well to the glass substrate and bond well to a metal recording layer to produce a stable recording medium.

A number of well-known materials may be utilized as the data recording layer 43. Preferably, recording layer 43 is formed with relatively low melting point metals such as bismuth or tellurium. Recording layer 43 is preferably formed to a thickness of about 50–200 Angstroms in order to provide a high sensitivity to laser energy incident thereon.

Layer 44 of plastic material has the principal function to protect the recording layer 43 from abrasion and contamination by chemicals or other materials existing in the ambient environment in which recording medium 40 will be employed. Since intermediate layer 42 is formed of a solvent-resistant plastic material, protective layer 44 can be formed in a solvent-plastic coating process using any of the common plastics, including acrylic, polystyrene, polyurethane, polyethylene, epoxy, cellulose acetate materials or mixtures thereof dissolved in a solvent such as toluene, ketone or aromatic hydrocarbons. The solvents will not themselves adversely affect the thin recording layer and the solvent-resistance of the intermediate layer 42 maintains the integrity of the bond of both recording layer 43 to intermediate layer 42 and intermediate layer 42 with substrate 41. To provide sufficient protection for recording layer 43, the protective layer 44 is preferably formed to a thickness of at least 0.5 microns.

In general the formation of a crosslinked polymeric material to serve as intermediate layer 42 involves the selection of one or more polymeric materials with active hydroxyl, carboxylic or hydrogen (amide) groups to react with organic moieties that condense on such active groups in the presence of a catalyst and at an elevated temperature to speed the crosslinking. Alternatively, certain components of organic moieties can be reacted together with certain catalysts to form self-condensation polymers. Some general examples of active polymers which may be utilized are cellulose esters, polyvinyl acetals, polyester resins, acrylic resins, epoxy resins, polyvinyl alcohol, polyvinyl acetate, and alkyd resins. Some examples of crosslinking moieties are melamine resins, isocyanates, acid anhydrides and formaldehyde resins. Useful catalysts include a number of acids, bases and organometallics.

The following specific examples are given to illustrate the present invention in greater detail but are not to be construed to limit the scope of the invention.

EXAMPLE 1

A clean glass slide was coated with a plastoic having the following formulation of components:

| Components | Parts by Weight |
|---|---|
| Polyester 4900 (DUPONT) | 5 |
| Methylene Chloride | 86.75 |
| Flow Control Agent | 0.16 |
| Methyl Oxitol | 7.8 |

-continued

| Components | Parts by Weight |
|---|---|
| Isocyanate Prepolymer (RC 803-DUPONT) | 0.25 |

The slide coated with this formulation was baked for four hours at a temperature of 150° C. to produce crosslinking of the polyester resin and isocyanate prepolymer. This resulted in a clear plastic coating about 0.5 microns thick with excellent adhesion to the glass slide and good solvent resistance. Adhesion was tested by cellophane tape on the layer and pulling it off at right angles to the substrate. Solvent resistance was tested by dropping methyl ethyl ketone on the surface and rubbing the surface with a swab having MEK thereon. Thereafter a layer of tellurium approximately 200 Angstroms thick was applied to the crosslinked plastic layer by vacuum deposition. Next, a protective coating of polymeric material was applied to the tellurium recording layer utilizing the following components:

| Components | Parts by Weight |
|---|---|
| Cellulose Acetate Butyrate (CAB 381-20 - EASTMAN CHEMICALS) | 7.5 |
| Methyl Ethyl Ketone | 89.5 |
| Flow Control Agent | 0.06 |
| Methyl Oxitol | 2.94 |

The protective coating was baked for about fifteen minutes at a temperature of 110° C. Thereafter inspection of the three-layer structure showed that no dissolution of the underlying crosslinked polymer layer had occurred and an integral encapsulated metal recording layer was produced.

EXAMPLE 2

A clean glass slide was coated with a plastic formulation having the following components:

| Components | Parts by Weight |
|---|---|
| Oil-Free Polyester Alkyd Resin (Aroplaz 6755-A1-80 - ASHLAND CHEMICALS) | 58 |
| Methyl Ethyl Ketone | 274 |
| Hexamethoxy Methyl Melamine (CYMEL 303 - AMERICAN CYANAMID) | 22.5 |
| Flow Control Agent | 0.6 |
| Cellulose Acetate Butyrate (CAB 551-0.2 - EASTMAN CHEMICALS) | 1.6 |
| Methyl Oxitol | 235 |
| P-Toluene Sulfonic Acid as a catalyst (CYCAT 4040 - AMERICAN CYANAMID) | 0.7 |
| Isopropanol | 15.4 |

The plastic coating with the above formulation was baked for fifteen minutes at a temperature of 150° C. to produce a crosslinked melamine-polyester film. This plastic film was the optically clear coating with excellent adhesion and solvent resistance. The coating thickness was approximately 0.5 microns.

The next step was to apply a thin layer of tellurium to serve as the recording layer. This was done by vacuum deposition of a thin film about 200 Angstroms thick. Thereafter the same protective coating as described in Example 1 was applied. The resulting structure was an integral encapsulated metal recording layer having no damage to the intermediate layer caused during the formation of the protective coating.

EXAMPLE 3

A clean glass slide was coated with a plastic material having the following formulation:

| Components | Parts by Weight |
|---|---|
| Hexamethoxy Methyl Melamine (CYMEL 303 - AMERICAN CYANAMID) | 17 |
| Methyl Ethyl Ketone | 423 |
| Flow Control Agent | 0.34 |
| P-Toluene Sulfonic Acid as a catalyst (CYCAT 4040 - AMERICAN CYANAMID) | 0.8 |
| Methyl Oxitol | 16.7 |
| Isopropanol | 17.2 |
| Cellulose Acetate Butyrate (CAB 381-0.5 - EASTMAN CHEMICALS) | 25 |

The plastic coating with this formulation was baked for fifteen minutes at 150° C. to achieve crosslinking of the constituent materials. The resulting clear coating had excellent adhesion and good solvent resistance. The coating thickness was approximately 0.5 microns.

Thereafter a recording layer of tellurium was deposited in a vacuum deposition process to a thickness of approximately 200 Angstroms followed by application of a protective coating as described above in Example 1. This resulted in an integral encapsulated metal recording layer in which the intermediate coating was not affected by the application of the protective coating.

EXAMPLE 4

A clean glass slide was coated with a plastic material having the following formulation:

| Components | Parts by Weight |
|---|---|
| Oil-free Polyester Alkyd Resin (Aroplaz 6755-A1-80 - ASHLAND CHEMICALS) | 49.2 |
| Methyl Ethyl Ketone | 232.6 |
| Hexamethoxy Methyl Melamine (CYMEL 303 - ASHLAND CHEMICALS) | 19.2 |
| Flow Control Agent | 0.5 |
| Cellulose Acetate Butyrate (CAB 551-0.2 - EASTMAN CHEMICALS) | 1.4 |
| Methyl Oxitol | 199.4 |
| Isopropanol | 13.1 |
| Xylene | 105 |
| P-Toluene Sulfonic Acid as a catalyst (CYCAT 4040 - AMERICAN CYANAMID) | 0.6 |

The plastic coating with this information was then baked for fifteen minutes at a temperature of 150° C. to produce crosslinking of the plastic constituents. An optically clear coating with excellent adhesion and solvent resistance in accordance with standard tests was obtained. The plastic layer had a thickness of about 0.5 microns.

Thereafter a layer of tellurium about 200 Angstroms thick was deposited on the intermediate plastic coating in a vacuum depositing process. Thereafter a second plastic layer was formed by applying a plastic material of the following composition on the layer of tellurium:

| Components | Parts by Weight |
|---|---|
| Hexamethoxy Methyl Melamine (CYMEL 303 - AMERICAN CYANAMID) | 8.5 |
| Methyl Ethyl Ketone | 423 |
| Flow Control Agent | 0.17 |

-continued

| Components | Parts by Weight |
|---|---|
| Cellulose Acetate Butyrate (CAB 381-0.5 - EASTMAN CHEMICALS) | 12.5 |
| Methyl Oxitol | 0.8 |
| Isopropanol | 8.6 |
| P-Toluene Sulfonic Acid as a catalyst (CYCAT 4040 - AMERICAN CYANAMID) | 0.4 |

This second plastic coating was baked for fifteen minutes at a temperature of 150° C. to produce crosslinking of the plastic constituents. This resulted in a protective layer over the tellurium recording layer with no disturbance of either the tellurium layer or the underlying plastic layer.

Thereafter a layer of aluminum was applied to the second plastic layer by vacuum deposition to a thickness of approximately 750 Angstroms. Finally, a protective coating of polymeric material was applied over the aluminum film utilizing the protective layer composition set forth above in Example 1.

The laser recording medium produced in accordance with this example utilizes the tellurium layer as the recording layer with the aluminum layer acting as a reflective layer for laser beam energy transmitted through the thin tellurium layer. The resulting laser recording medium was characterized by excellent durability and stability of the constituents layers.

EXAMPLE 5

A clean glass slide was coated with a plastic material having the following formulation:

| Components | Parts by Weight |
|---|---|
| Polyvinyl Butyral (BUTVAR B-73 - MONSANTO) | 11.2 |
| Methyl Oxitol | 924 |
| Hexamethoxy Methyl Melamine (CYMEL 303 - AMERICAN CYANAMID) | 7.4 |
| Flow Control Agent | 0.14 |
| Isopropanol | 10.7 |
| P-Toluene Sulfonic Acid (CYCAT 4040 - AMERICAN CYANAMID) | 0.49 |

The plastic coating with this formulation was baked for fifteen minutes at a temperature of 150° C. to produce cross-linking of the constituent plastic material. An optically clear coating with excellent adhesion and solvent resistance was achieved. Formation of a complete recording medium utilizing this intermediate layer can then be achieved using any of the additional steps set forth in previous examples.

EXAMPLE 6

In this example a catalyzed one component plastic layer was formed by coating a clean glass slide with a plastic material of the following formulation:

| Components | Parts by Weight |
|---|---|
| Hexamethoxy Methyl Melamine (CYMEL 303 - AMERICAN CYANAMID) | 25 |
| Methyl Ethyl Ketone | 200 |
| Flow Control Agent | 0.2 |
| Methyl Oxitol | 9.8 |
| Isopropanol | 14.3 |
| P-Toluene Sulfonic Acid as a catalyst (CYCAT 4040 - AMERICAN CYANAMID) | 0.7 |

The coating with this formulation was baked for fifteen minutes at a temperature of 150° C. to produce a self-condensation type crosslinking of the plastic material. The result was an optically clear coating with excellent adhesion and solvent resistance. Completion of a laser recording medium can be achieved as in any of the Examples 1-4 set forth above.

EXAMPLE 7

A clean glass slide was provided with a layer of parylene C deposited on both sides of the glass slide with a thickness of about 10 microns. Thereafter a layer of tellurium was vacuum deposited on the parylene layer to a thickness of approximately 200 Angstroms. Next, a protective coating of a plastic material having the following composition was applied:

| Components | Parts by Weight |
|---|---|
| Cellulose Acetate Butyrate (CAB 381-20 - EASTMAN CHEMICALS) | 7.5 |
| Methyl Ethyl Ketone | 89.5 |
| Flow Control Agent | 0.06 |
| Methyl Oxitol | 2.94 |

This coating was baked for about fifteen minutes at a temperature of 110° C. The protective layer thusly formed was approximately two microns thick. The solvent-based protective coating produced no damage to the recording layer or the intermediate layer of parylene and, accordingly, an integral encapsulated recording layer was produced.

In each of the above examples the Flow Control Agent may comprise one of the Union Carbide silicones marketed under the trade names L4500, L5310, and L6202. It will be appreciated by those skilled in this art that other permutations and combinations of the various examples set forth above could be employed to achieve the same or similar results.

It will be apparent to those skilled in the art that the structure of this invention could be adapted to form a more complex laser recording medium involving one or more additional recording layers by utilizing successive layers of solvent-resistant material with a final solvent-based material utilized as the protective coating over the medium. Furthermore, the invention is readily adaptable to recording media structures involving a reflecting layer (not shown) formed on top of protective layer 44 shown in FIG. 2 with the thickness of the protective layer being selected in conjunction with the optical characteristics of the reflecting layer formed thereon to maximize the reflection of optical energy transmitted through recording layer 43 back to that recording layer, thereby to further increase the sensitivity of the recording medium to laser beam energy. Example 4 above comprises a recording medium structure having such a reflecting layer and including a final protective coating formed over the aluminum reflecting layer to completely encapsulate it.

What is claimed is:

1. A laser recording medium comprising: a substrate; a first layer of plastic material formed on said substrate; a layer of optical energy absorbing material formed on said first layer of plastic material; and a second layer of plastic material formed on said layer of energy absorbing material to provide a protective coating therefor; said plastic material of said first layer being a cross-linked polymeric material characterized by high optical clarity and substantial resistance to solvents, and said plastic material of said second layer being a solvent-based plastic material, said medium thereby being characterized by undisturbed bonding integrity between said first layer of plastic material and said layer of optical energy absorbing material.

2. A laser recording medium constructed by a process including the steps of:

forming on a substrate a first layer of crosslinked polymeric material having high optical clarity and substantial resistance to solvents;

forming directly over said first layer of polymeric material a layer of optical energy absorbing material; and forming directly over said layer of optical energy protective layer of solvent-based plastic material.

3. A laser recording medium as claimed in claim 2, wherein said step of forming said layer of crosslinked polymeric material comprises reacting at least one active polymeric material with a material component selected from a class of materials comprising crosslinking organic moieties.

4. A laser recording medium as claimed in claim 3, wherein said step of reacting is carried out at an elevated temperature and in the presence of a component selected from a class of materials comprising catalysts to speed the formation of said crosslinked polymeric material.

5. A laser recording medium as claimed in claim 2, wherein said step of forming said layer of crosslinked polymeric material comprises reacting together at least two components selected from a class of materials comprising crosslinking organic moieties in the presence of a component selected from a class of materials comprising catalysts to form a self-condensing polymeric material.

6. A laser recording medium comprising: a substrate; a first layer of plastic material formed on said substrate; a layer of optical energy absorbing material formed on said first layer of plastic material; and a second layer of plastic material formed on said layer of energy absorbing material to provide a protective coating therefor; said plastic material of said first layer being parylene and said plastic material of said second layer being a solvent based plastic material.

7. A laser recording medium comprising:

a substrate;

a first layer of plastic material formed on said substrate and characterized by substantial resistance to solvents;

a layer of optical energy absorbing material formed on said first layer of plastic material;

a second layer of plastic material formed on said layer of energy absorbing material and being characterized by substantial resistance to solvents;

a layer of reflecting material formed on said second layer of plastic material; and a third layer of plastic material formed on said layer of reflecting material to provide a protective coating therefor, said third layer being a solvent-based plastic material.

* * * * *